United States Patent [19]

Inoue et al.

[11] Patent Number: 5,781,311
[45] Date of Patent: Jul. 14, 1998

[54] PLANAR LIGHT SOURCE AND IMAGE READING DEVICE

[75] Inventors: Osamu Inoue; Yoshiyuki Takeda, both of Kanagawa-ken, Japan

[73] Assignee: Nikon Corporation, Tokyo, Japan

[21] Appl. No.: 600,894

[22] Filed: Feb. 13, 1996

Related U.S. Application Data

[62] Division of Ser. No. 427,235, Apr. 24, 1995.

[30] Foreign Application Priority Data

Aug. 24, 1994 [JP] Japan .................. 6-199869
Sep. 9, 1994 [JP] Japan .................. 6-215136

[51] Int. Cl.[6] .............. H04N 1/04; H04N 1/40; H04N 1/46; G03B 27/54
[52] U.S. Cl. .......... 358/475; 358/461; 358/509; 358/487; 355/67; 362/26; 362/31
[58] Field of Search .................. 358/475, 474, 358/494, 497, 487, 461, 509, 505; 250/234, 235; 355/67; 362/26, 31

[56] References Cited

U.S. PATENT DOCUMENTS

| 4,729,067 | 3/1988 | Ohe ............................ 362/26 |
| 4,870,501 | 9/1989 | Yoshida ..................... 358/284 |
| 5,038,277 | 8/1991 | Koshiyouji et al. ........ 358/471 |
| 5,178,447 | 1/1993 | Murase et al. .............. 362/31 |

*Primary Examiner*—Edward L. Coles, Sr.
*Assistant Examiner*—Tia M. Harris
*Attorney, Agent, or Firm*—Oliff & Berridge, PLC

[57] ABSTRACT

An image reading device includes a planar light source having sufficiently even illumination to allow accurate shading correction to be performed regardless of the position in the auxiliary scanning direction. The image reading device includes a light source, a photoelectric conversion device, a movement device and a computer. The planar light source includes a rod-shaped light-emitting device and a light-guiding plate that receives light from the rod-shaped light-emitting device and emits light from a single surface. The rod-shaped light-emitting device is at least along one lengthwise side of the light-guiding plate. The photoelectric conversion device converts the image into an electrical image signal which is processed by the computer. The movement device moves the photoelectric conversion device in the auxiliary scanning direction, which is substantially perpendicular to the longer lengthwise side of the photoelectric conversion device and substantially perpendicular to the longer lengthwise side of the rod-shaped light-emitting device.

11 Claims, 6 Drawing Sheets

PLANAR LIGHT SOURCE AND IMAGE READING DEVICE

This is a Division of application Ser. No. 08/427,235 filed Apr. 24, 1995.

BACKGROUND OF THE INVENTION

1. Field of the Invention

The present invention relates to a device which illuminates and reads the illuminated images on an original document such as photo film or the like.

2. Description of Related Art

U.S. Pat. No. 5,038,227 discloses an image reading device which illuminates an original sheet and reads the illuminated images from the original sheet using light transmitted through the original sheet. This conventional type of image reading device is described with reference to FIGS. 8A–8B.

Figure 8A:
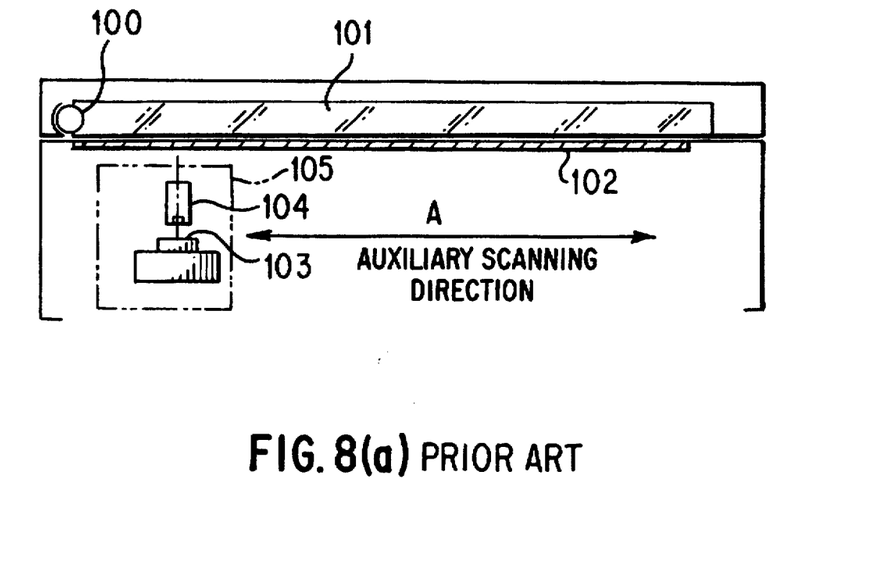
FIGS. 8A and 8B are drawings showing a conventional image reading device.
Figure 8B:
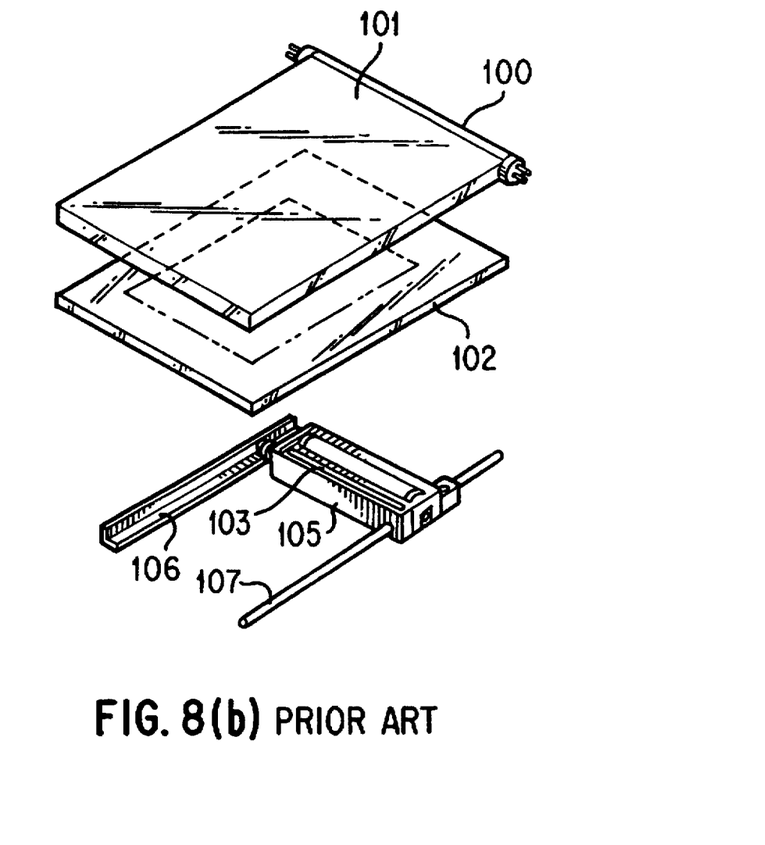

Rod-shaped fluorescent tube 100 is mounted integrally on light-guiding plate 101 substantially perpendicular to the auxiliary scanning direction A. Light-guiding plate 101 may be a plastic diffusion panel. Light-guiding plate 101 diffuses and then emits the fluorescent tube light 100 in a planar manner.

An original such as photo film is placed on platen glass 102 and held in place under light-guiding plate 101.

CCD 103 is a linear imaging device and converts the image into an electrical image signal. The lengthwise direction of CCD 103 is the primary scanning direction and is substantially perpendicular to the auxiliary scanning direction A.

Photography optical system 104 is used to optically guide images from the original to CCD 103. Carriage 105 moves in the auxiliary scanning direction A along guides 106 and 107 and holds CCD 103 and photography optical system 104.

Next, operation of the conventional device reading an image from a transparent original is described. The entire transparent original is illuminated by fluorescent tube 100 and light-guiding plate 101. Carriage 105 moves over the transparent original while in succession CCD 103 reads images through photographic optical system 104.

Fluorescent tube 100 of a conventional device is mounted along the primary scanning direction. The following problems arise because rod-shaped fluorescent tube 100 is positioned along the primary scanning direction of light-guiding plate 101 as shown in FIGS. 8A–8B. The transparent original's illumination is uneven because illuminating light does not sufficiently reach the portions of light-guiding plate 101 farthest from fluorescent tube 100. Therefore, it is necessary to perform shading correction as described below.

The output of the CCD is not constant even for same level pixels because of unevenness in the luminosity of the illuminating light source and differences in light levels at each pixel in the CCD. Thus, shading is measured by the CCD reading light from portions that are not in the transparent original. Based on these results, the CCD output values are normalized to a standard value and the unevenness in reading is corrected. This correction is called shading correction.

Because the brightness decreases with distance from fluorescent tube 100, the output of shading measurements varies. Consequently, even if a correction value is determined from a shading measurement value at one position, adequate shading correction cannot be performed at different positions in the auxiliary scanning direction.

SUMMARY OF THE INVENTION

It is an object to provide a light source with little unevenness in illumination. It is a further object to provide a light source with accurate shading correction regardless of the position in the auxiliary scanning direction.

The planar light source of the invention includes: a rod-shaped light-emitting device and a light-guiding plate that receives light from the rod-shaped light-emitting device and emits light from a single surface. The rod-shaped light-emitting device is at least along one lengthwise side of the light-guiding plate.

The image reading device includes a light source, a photoelectric conversion device and a movement device. The light source includes a rod-shaped light-emitting member and a light-guiding plate that in combination emit light from a single surface. The photoelectric conversion device converts the image into an electrical image signal. The movement device moves the photoelectric conversion device in a scanning direction. The scanning device is substantially perpendicular to the longer lengthwise side of the photoelectric conversion device and substantially perpendicular to the longer lengthwise side of the rod-shaped light-emitting device of the light source.

By positioning the rod-shaped light-emitting device of the planar light source along at least one longer lengthwise side of the light-guiding plate, the distance is shortened between rod-shaped light-emitting device and the furthest position on the light-guiding plate, which reduces uneven lighting in the planar light source.

Further, by positioning the rod-shaped light-emitting device with the lengthwise direction of substantially perpendicular to the scanning direction, shading correction can be performed with accuracy in all positions within transparent original document reading region of the image reading device.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

An image reading device according to a first preferred embodiment is described in reference to FIGS. 1–6.

Figure 1:
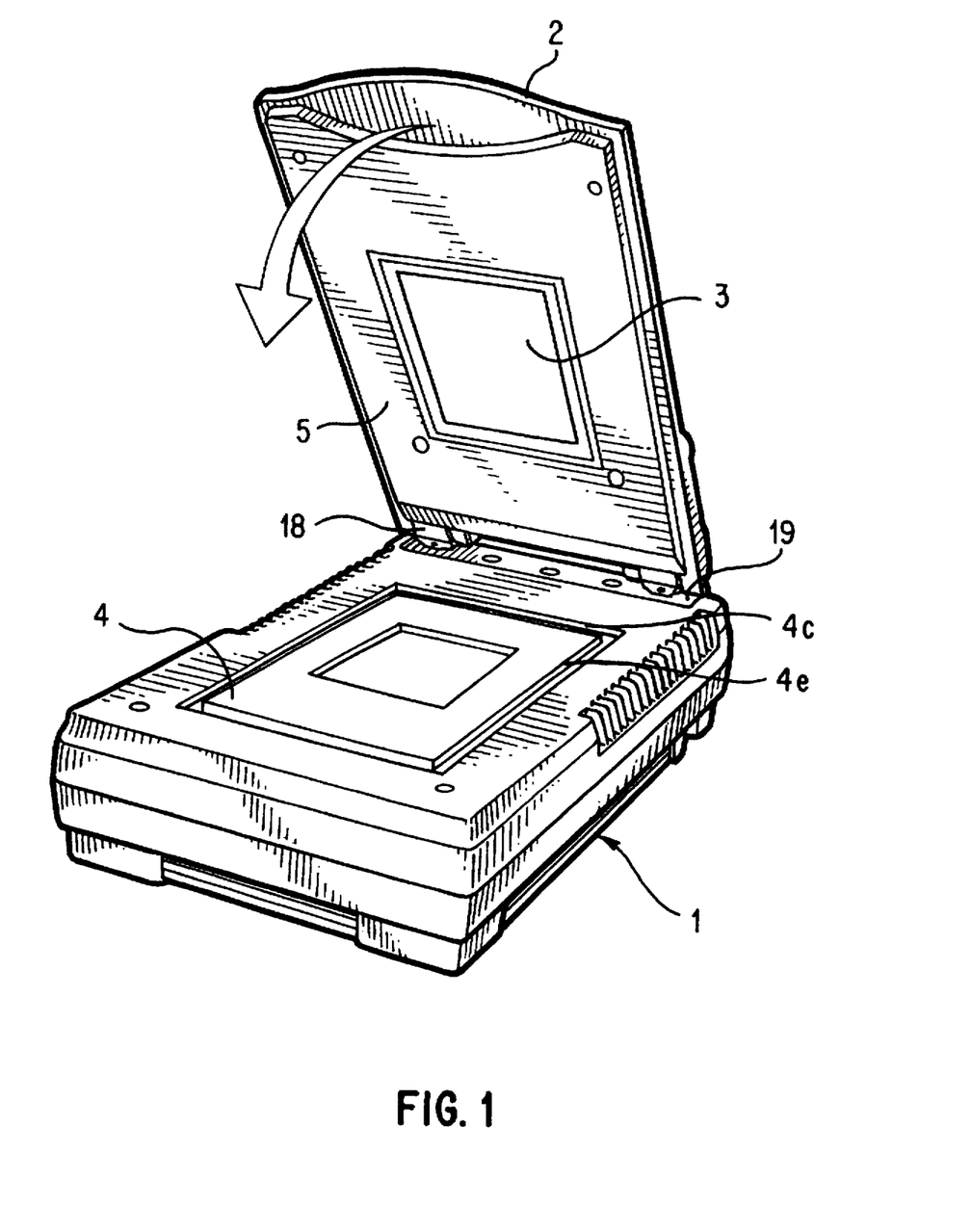
FIG. 1 is a perspective view of an image reading device according to one embodiment of the present invention.

FIG. 1 shows an image reading device 1 connected to a host computer (not shown) through a signal cable (not shown). Image reading device 1 operates under commands from the host computer, reading images and sending image signals to the host computer.

Figure 6:
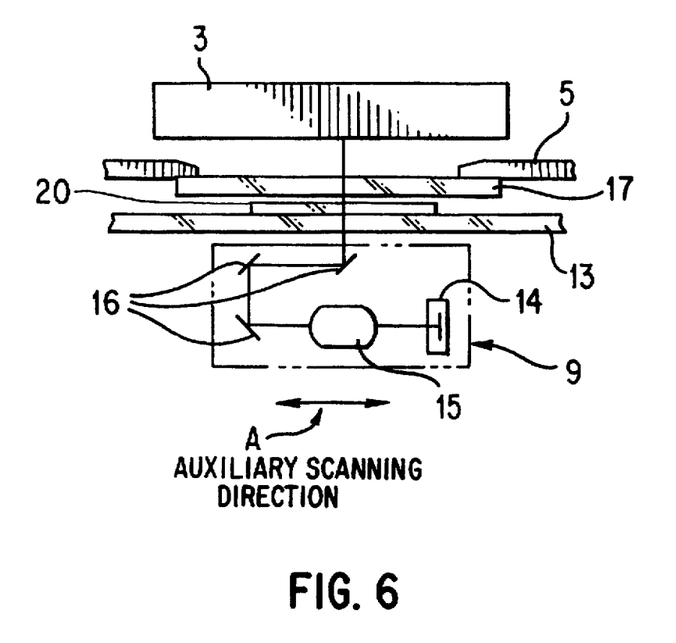
FIG. 6 is a schematic drawing of the light path in an image reading device according to one embodiment of the present invention.

Hinge unit 18 attaches transparent illumination unit 2 to image reading device 1. The planar light source 3 attaches to transparent illumination unit 2. Planar light source 3 illuminates an original document and is protected by light source protecting glass 17, as shown in FIG. 6.

During operation of the image reading device, an original document lies on top of platen glass 13. Light-shielding sheet 4 is mounted to platen glass 13. Shading window 4C is a window used for shading measurements. Transparent original reading region 4E is where an original document is placed and may be bordered by a white frame. Transparent original reading region 4E is preferably the document placement frame and has dimensions 5 inches vertically and 4 inches horizontally.

Figure 2:
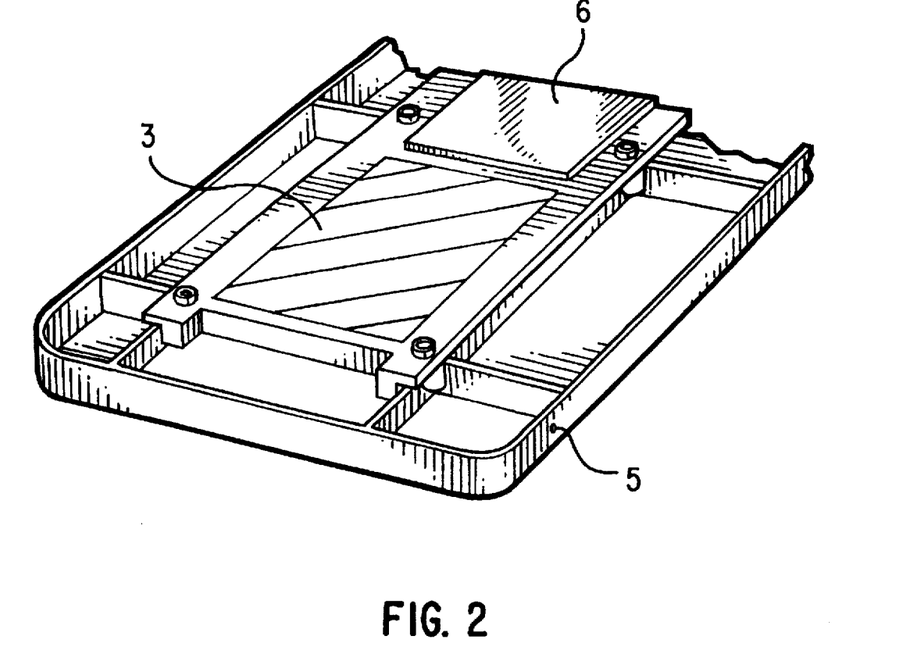
FIG. 2 is a perspective cross-sectional view of a transparent illumination unit according to one embodiment of the present invention.
Figure 3:
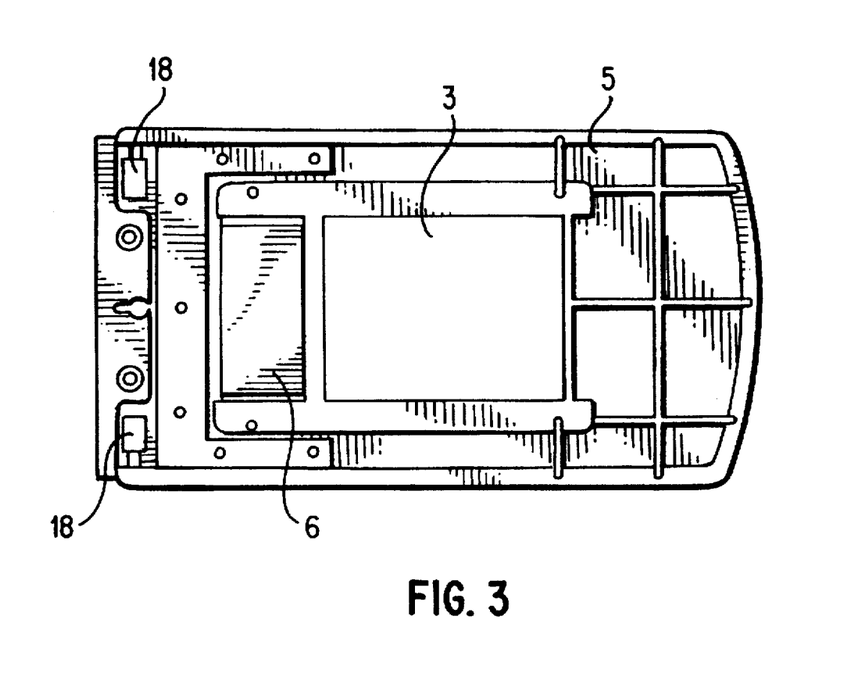
FIG. 3 is a top view of FIG. 2.

As described with respect to FIG. 2 and FIG. 3, planar light source 3 is positioned in the shaded portion on unit bottom cover 5. Light source drive circuit 6 drives planar light source 3 and is positioned between planar light source 3 and hinge unit 18. Consequently, the center of gravity of transparent illumination unit 2 is at a position close to hinge unit 18 and a user need not exert much force when opening and closing transparent illumination unit 2. Also, costs are reduced when wiring is shortened because the distance between light source drive unit 6 and hinge unit 18 is small.

Figure 4:
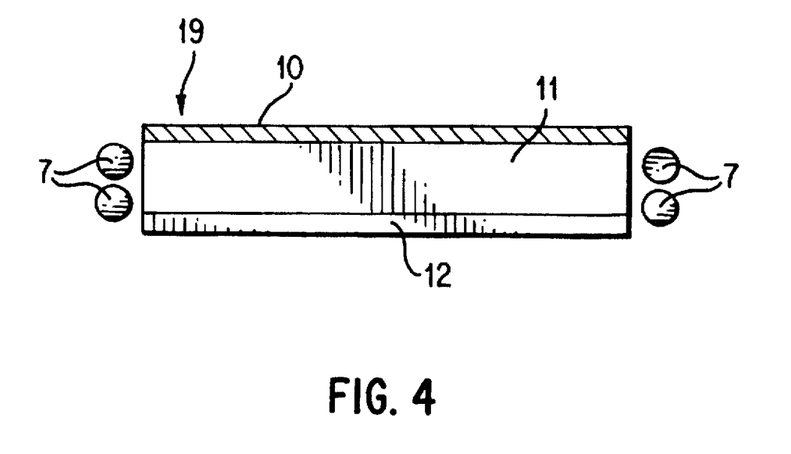
FIG. 4 is a diagram of a planar light source according to one embodiment of the present invention.
Figure 5:
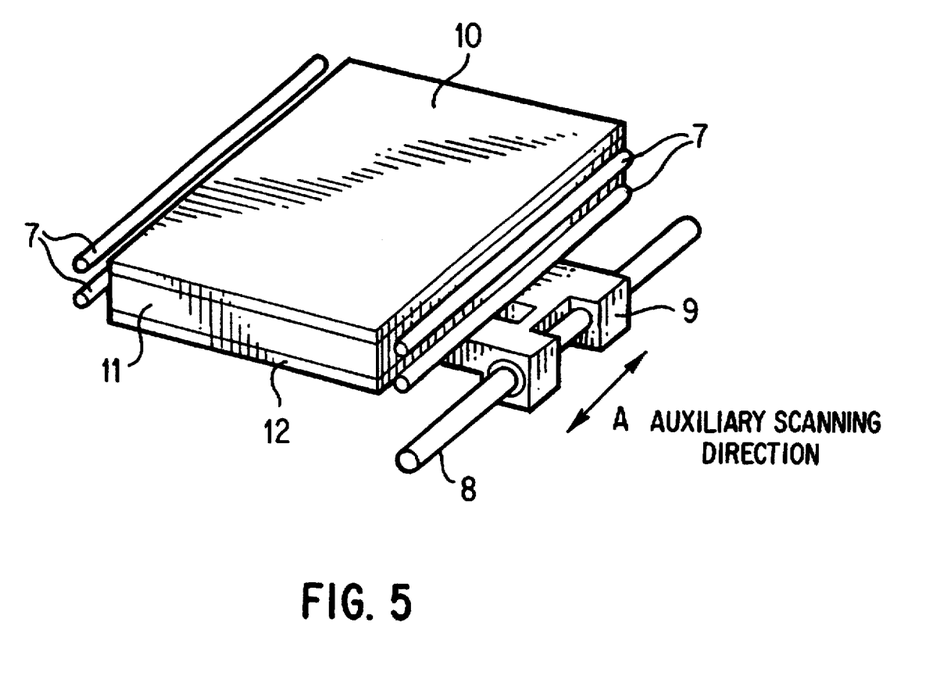
FIG. 5 is a perspective view of a planar light source and carriage according to one embodiment of the present invention.

The planar light source 3 will now be described with reference to FIG. 4 and FIG. 5. Planar light source 3 includes light-guiding plate 19 and fluorescent tubes 7. Preferably, four rod-shaped fluorescent tubes 7 are positioned with two each along each side of light-guiding plate 19 in the longer lengthwise or vertical direction.

Light-guiding plate 19 is preferably a plastic dispersion panel including light-guiding unit 11, reflective sheet unit 10 and dispersion sheet unit 12. Illuminating light emitted from fluorescent tubes 7 travels within light-guiding unit 11 while being reflected between reflective sheet unit 10 and dispersion sheet unit 12. A portion of the illuminating light striking dispersion sheet unit 12 is dispersed and the light-guiding plate 19 emits light in a planar manner.

The distance between fluorescent tubes 7 and the position in light-guiding plate 19 farthest from fluorescent tubes 7 is half of the breadth of light-guiding plate 19 in the shorter horizontal direction. Consequently, the distance between fluorescent tubes 7 and the position in light-guiding plate 19 farthest from fluorescent tubes 7 is less than in a conventional device where fluorescent tubes 7 are positioned along the short direction of light-guiding plate 19, as shown in FIGS. 8A–8B. Consequently, unevenness in illumination by planar light source 3 is reduced and high illumination luminosity may be achieved with little electric power.

Positioning a plurality of fluorescent tubes 7 on the sides of light-guiding plate 19 causes at least the following results. Even if one of the fluorescent tubes shuts off, images can be read in regions where shading correction is possible. Also, if only one fluorescent tube 7 is on a side, more precise positioning of the fluorescent tube is necessary for sufficient dispersion of the illuminating light. However, by positioning a plurality of fluorescent tubes 7 along the sides, sufficient dispersion of the illuminating light exists even if fluorescent tubes 7 are attached at slightly shifted positions. Accordingly, attaching fluorescent tubes 7 is simplified and costs less.

The lighting distributed by the planar light source 3 decreases with the distance from fluorescent tubes 7. As shown in FIG. 5, positioning the rod-shaped fluorescent tubes 7 so the lengthwise direction of each substantially coincides with auxiliary scanning direction A, causes the lighting distribution of the planar light source 3 to be determined by the distance from fluorescent tubes 7.

The lighting level is the same at all positions in planar light source 3 on a straight line in the auxiliary scanning direction A. As noted above, the lighting level of the illuminating light and the level of the CCD pixels determines the output of shading measurements. With the above configuration, whether shading measurements are performed within the original reading region 4E or within shading window 4C, the result is the same. Hence, accurate shading correction is possible at any location within original reading region 4E when the correction is based on the results of shading measurements in shading window 4C. Accordingly, at least the conventional device problem of shading correction depending on the position in the auxiliary scanning direction A causing insufficient correction is solved.

The image reading unit is described with reference to FIG. 5 and FIG. 6. Carriage 9 houses CCD line sensor 14, lens 15 and reflecting mirrors 16. CCD line sensor 14 is a device used to convert images to electrical image signals. CCD line sensor 14 includes a plurality of imaging elements arranged in a single line. Carriage 9 is joined to carriage guide shaft 8 by inserting the carriage guide shaft 8 so the carriage is moveable in the auxiliary scanning direction A.

The image reading operation of image reading device 1 is described with reference to FIG. 6. Transparent original 20 is placed in transparent original reading region 4E and held in place by being interposed between platen glass 13 and light source protecting glass 17. When a command is received from the host computer (not shown), planar light source 3 emits light that illuminates the transparent original 20 and shading window 4.

CCD line sensor 14 performs shading measurement on light illuminating shading window 4. A correction value for shading correction is determined by a CPU (not shown) based on the results of the shading measurement. Shading correction is preferably performed each time a screen of transparent original 20 is input by the CCD line sensor 14. Thus, accurate shading correction on each image is possible even when illuminating conditions or the like change.

Next, CCD line sensor 14 is moved to the edge of transparent original 20. Then, light which has passed through the transparent original 20 is reflected by reflecting mirrors 16 and reaches CCD line sensor 14 after being condensed by lens 15.

CCD line sensor 14 converts the input image into an electrical image signal, and outputs the electrical image signal to a frame memory (not shown) after a shading correction is performed by the CPU (not shown).

A motor (not shown) moves carriage 9 in the auxiliary scanning direction A. CCD line sensor 14 reads the images on transparent original 20 in succession accompanying the movement of carriage 9. After each single screen of transparent original 20 has been read, the electrical image signals are output from the frame memory to the host computer (not shown).

Next, the transparent original reading region 4E is described. Dot printing is performed on the side of light-guiding unit 11 toward reflecting sheet unit 10. Moving in the primary scanning direction, the printed dots become more dense toward the inside of the light-guiding plate 19 and more sparse toward the outside. Consequently, planar light source 3 emits the strongest light at the center.

Figure 7A:
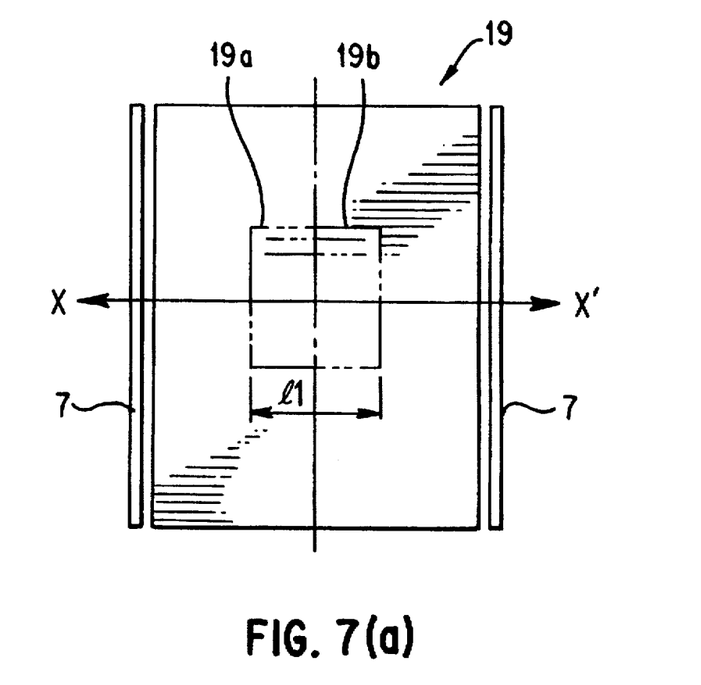
FIG. 7A is a schematic drawing showing the planar light source according to one embodiment of the present invention.
Figure 7B:
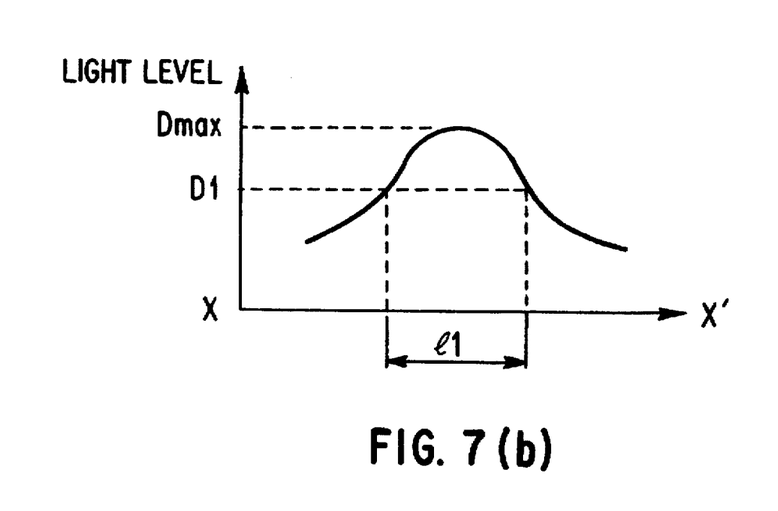
FIG. 7B is a graph of planar light source luminosity unevenness along cross-section x-x' in FIG. 7A.

FIG. 7a shows another preferred embodiment of planar light source 3. Frame 19a (dashed in FIG. 7a) corresponds to the position of the shading window 4C and the transparent original reading region 4E. Frame 19b (dashed in FIG. 7a) corresponds to the position of shading window 4C. FIG. 7b shows the light distribution along cross-section x-x' in FIG. 7a.

The maximum level Dmax occurs essentially in the horizontal center of frame 19a, and the light level becomes lower the farther from center in the x axis direction. The light level on the side of frame 19a at the x-x' cross section is D1. D1 is the minimum value of the light level within frame 19a, as shown in FIG. 7b. The unevenness of luminosity of frame 19a can be expressed by the following formula:

Luminosity unevenness (%)=((Dmax−D1)/Dmax×100.

Shading correction is possible in this embodiment if the luminosity unevenness is no greater than 40%. Setting, for example, Dmax to 100%, shading correction of the luminosity unevenness is possible if D1 is not less than 60%.

This embodiment provides the frame of transparent original reading region 4E on the transparent original support unit and preferably is used as an original document placement frame at the position corresponding to 60% luminosity. Hence, the user is prevented from placing the original at a position where shading correction is impossible. Good quality image data will be read from an original document placed within the transparent original reading region 4E. However, shading correction is performed with greater accuracy by keeping the luminosity unevenness of frame 19b of shading window 4C not greater than 30%.

This embodiment provides the frame of transparent original reading region 4E at a position corresponding to a D1 light level of 60%, but the frame of transparent original reading region 4E may also be larger (i.e., toward the side) as long as shading correction remains possible.

As many different embodiments of this invention may be made and used without departing from the spirit and scope, it is understood that the invention is not limited to the specific embodiments.

What is claimed is:

1. An image reading device comprising:
   a document table for supporting an original document;
   planar light-emitting device having a plate-like shape that emits light from one surface toward the document table;
   a light-emitting device drive circuit that drives the planar light-emitting device;
   a support unit that supports the planar light-emitting device and the light-emitting device drive circuit; and
   a hinge unit connecting the support unit and the document table to allow pivotal movement of the support unit relative to the document table such that the support unit assumes an open position and a closed position relative to the document table,
   wherein the light-emitting device drive circuit is positioned on the support unit between the planar light-emitting device and the hinge unit.

2. An image reading device according to claim 1, wherein positioning of the light-emitting device drive circuit in the support unit moves the center of gravity of the support unit toward the hinge unit.

3. An image reading device, comprising:
   a document table for supporting an original document;
   a planar light-emitting device having a plate-like shape that emits light from one surface toward the document table;
   a light-emitting device drive circuit that drives the planar light-emitting device;
   a support unit that supports the planar light-emitting device;
   a photoelectric conversion device that converts an image of an original document into an electrical image signal;
   a shading correction device that performs shading correction on the image signal, the shading correction including electrical correction of the image signal;
   a document placement frame on the document table corresponding to a region of the planar light-emitting device that emits a quantity of light sufficient for shading correction by the shading correction device; and
   a hinge unit connecting the support unit and the document table to allow pivotal movement of the support unit relative to the document table such that the support unit assumes an open position and a closed position relative to the document table,
   wherein the light-emitting device drive circuit is positioned on the support unit between the planar light-emitting device and the hinge unit.

4. An image reading device according to claim 3, wherein the planar light-emitting device extends along a longitudinal axis defining a lengthwise direction and receives light emitted from a rod-shaped light-emitting source positioned along both longitudinal sides of the planar light-emitting device,
   wherein maximum luminosity in a direction substantially perpendicular to the longitudinal axis of the planar light-emitting device occurs in a central area of the document placement frame.

5. An image reading device according to claim 4, wherein the document placement frame delineates 60% of maximum luminosity of the planar light-emitting device.

6. An image reading device according to claim 3, wherein the planar light emitting device extends along a longitudinal axis defining a lengthwise direction, and wherein emitted light has substantially constant luminosity along the longitudinal axis.

7. An image reading device according to claim 6, wherein a shading correction value is constant in the lengthwise direction.

8. A method of reading an original document, comprising:
   transmitting light from a planar light emitting device to an original document placement frame;
   illuminating the original document placement frame so that luminosity of the planar light-emitting device is constant in at least one direction;
   moving a photoelectric conversion device over the illuminated original document placement frame in the at least one direction;
   converting an image of the original document in the original document placement frame to electrical signals;
   determining shading correction measurements for the electrical signals for each point in a direction substantially perpendicular to the at least one direction; and performing shading correction on the electrical image signal, wherein the step of transmitting planar light to the original document placement frame comprises the steps of receiving sufficient light within the original document placement frame for the shading correction and of locating the original document placement frame to correspond to 60% maximum luminosity of the planar light-emitting device.

9. The method according to claim 8, wherein the original document is transparent.

10. An image reading device, comprising:

a document table for supporting an original document;

planar light-emitting means having a plate-like shape for emitting light from one surface toward the document table;

photoelectric conversion means for converting an image of an original document into an electrical image signal;

shading correction means for performing shading correction on the image signal, the shading correction including electrical correction of the image signal; and a document placement frame on the document table corresponding to a region of the planar light-emitting means that emits a quantity of light sufficient for shading correction by the shading correction means, wherein the document placement frame delineates 60% of maximum luminosity of the planar light-emitting means.

11. An image reading device according to claim 10, wherein the planar light-emitting device extends along a longitudinal axis defining a lengthwise direction and receives light emitted from a rod-shaped light-emitting source positioned along both longitudinal sides of the planar light-emitting device, wherein maximum luminosity in a direction substantially perpendicular to the longitudinal axis of the planar light-emitting means occurs in a central area of the document placement frame.

\* \* \* \* \*